(12) United States Patent
Oe et al.

(10) Patent No.: US 10,853,936 B2
(45) Date of Patent: Dec. 1, 2020

(54) FAILED VEHICLE ESTIMATION SYSTEM, FAILED VEHICLE ESTIMATION METHOD AND COMPUTER-READABLE NON-TRANSITORY STORAGE MEDIUM

(71) Applicant: TOYOTA JIDOSHA KABUSHIKI KAISHA, Toyota-shi, Aichi-ken (JP)

(72) Inventors: Yoshihiro Oe, Kawasaki (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/164,250

(22) Filed: Oct. 18, 2018

(65) Prior Publication Data
US 2019/0164267 A1 May 30, 2019

(30) Foreign Application Priority Data

Nov. 28, 2017 (JP) .................................. 2017-228320

(51) Int. Cl.
*G06T 7/00* (2017.01)
*G06K 9/00* (2006.01)
*G07C 5/08* (2006.01)
*G08G 1/00* (2006.01)

(52) U.S. Cl.
CPC .......... *G06T 7/001* (2013.01); *G06K 9/00825* (2013.01); *G07C 5/085* (2013.01); *G07C 5/0808* (2013.01); *G06K 2209/15* (2013.01); *G06T 2207/30252* (2013.01); *G07C 5/0816* (2013.01); *G07C 5/0841* (2013.01); *G08G 1/20* (2013.01)

(58) Field of Classification Search
CPC ........ G06T 2207/30252; G07C 5/0816; G06K 9/00825
See application file for complete search history.

(56) References Cited

U.S. PATENT DOCUMENTS

| | | | | |
|---|---|---|---|---|
| 6,081,206 A * | 6/2000 | Kielland | ............ | G06Q 30/0284 194/902 |
| 8,862,315 B2 * | 10/2014 | Espinosa | ............. | G07C 5/0841 701/33.4 |
| 8,946,990 B1 * | 2/2015 | Gupta | .................... | B60Q 1/143 250/208.2 |
| 9,142,129 B2 * | 9/2015 | Satoh | ....................... | B60R 1/00 |

(Continued)

FOREIGN PATENT DOCUMENTS

JP 2015-212133 A 11/2015

*Primary Examiner* — Brian P Yenke
(74) *Attorney, Agent, or Firm* — Hunton Andrews Kurth LLP

(57) ABSTRACT

A failed vehicle estimation system includes an processor configured to: store vehicle information including vehicle ID information and positional information of the vehicles and failure information of a failed vehicle or at least one image obtained by imaging an outside of the vehicles with a camera mounted in each of the vehicles, the failure information being obtained from at least one specific image; specify at least one specific vehicle existing on a periphery of a mounting position of a specific camera having captured the at least one specific image from which the failure information of the failed vehicle is obtained; estimate the failed vehicle from among the at least one specific vehicle; and notify a terminal apparatus associated with the failed vehicle of information relating to a vehicle failure.

6 Claims, 5 Drawing Sheets

(56) References Cited

U.S. PATENT DOCUMENTS

| | | | |
|---|---|---|---|
| 9,467,687 B2* | 10/2016 | Takemura | H04N 17/002 |
| 9,582,944 B2* | 2/2017 | Merg | G07C 5/008 |
| 9,598,012 B2* | 3/2017 | Nagata | B60R 1/00 |
| 9,652,900 B2* | 5/2017 | Wen | B60K 31/18 |
| 9,665,997 B2* | 5/2017 | Morgan | G07C 5/0816 |
| 10,121,240 B2* | 11/2018 | Matsui | B60C 11/005 |
| 10,121,376 B2* | 11/2018 | She | B60W 10/20 |
| 10,155,477 B1* | 12/2018 | Mclean, Jr. | H05B 33/089 |
| 10,212,324 B2* | 2/2019 | Uchiyama | H04N 5/247 |
| 10,336,254 B2* | 7/2019 | Boesch | B60Q 11/005 |
| 10,399,106 B2* | 9/2019 | Dudar | G06T 7/0004 |
| 10,417,841 B2* | 9/2019 | Remboski | G07C 5/0808 |
| 10,417,929 B2* | 9/2019 | McQuade | G09B 19/14 |
| 2011/0095908 A1* | 4/2011 | Nadeem | B60H 3/00 340/905 |
| 2013/0342333 A1* | 12/2013 | Hutchings | H04N 7/18 340/435 |
| 2016/0379350 A1 | 12/2016 | Matsui et al. | |
| 2017/0154424 A1* | 6/2017 | Uchiyama | G06K 9/00771 |
| 2017/0178514 A1* | 6/2017 | Dry | H04L 67/00 |
| 2017/0316694 A1* | 11/2017 | Ryu | G08G 1/166 |
| 2018/0147986 A1* | 5/2018 | Chi | H04N 5/23218 |
| 2018/0336695 A1* | 11/2018 | Fujimura | G06T 7/136 |
| 2018/0350229 A1* | 12/2018 | Yigit | G08G 1/017 |
| 2019/0001887 A1* | 1/2019 | Guerreiro | G06T 3/0018 |
| 2019/0026573 A1* | 1/2019 | Nishimura | G06K 9/00812 |
| 2019/0164267 A1* | 5/2019 | Oe | G06T 7/0002 |
| 2019/0317517 A1* | 10/2019 | Boulton | B60W 30/09 |
| 2019/0347879 A1* | 11/2019 | Motomura | B60R 21/00 |
| 2020/0011689 A1* | 1/2020 | Tatsumi | G01C 21/3641 |
| 2020/0013242 A1* | 1/2020 | Hamada | G01S 7/52004 |
| 2020/0073399 A1* | 3/2020 | Tateno | G05D 1/0274 |
| 2020/0101967 A1* | 4/2020 | Seki | G06K 9/00791 |
| 2020/0175754 A1* | 6/2020 | Abe | G05D 1/0246 |
| 2020/0191975 A1* | 6/2020 | Watanabe | G06T 7/73 |

* cited by examiner

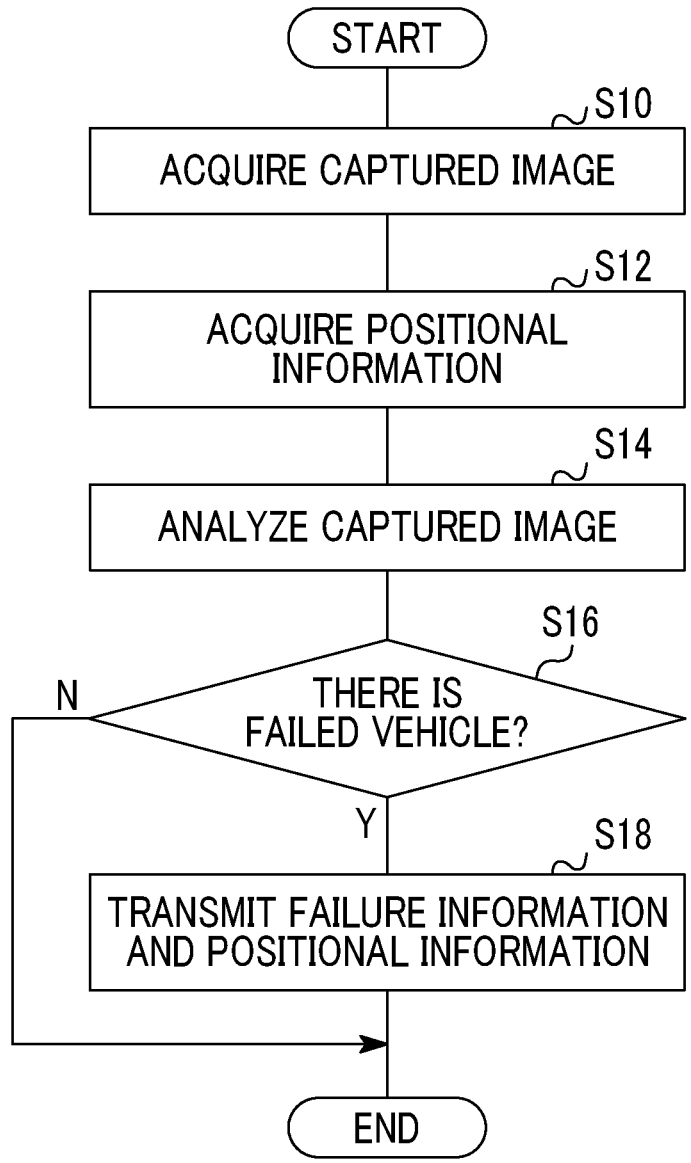

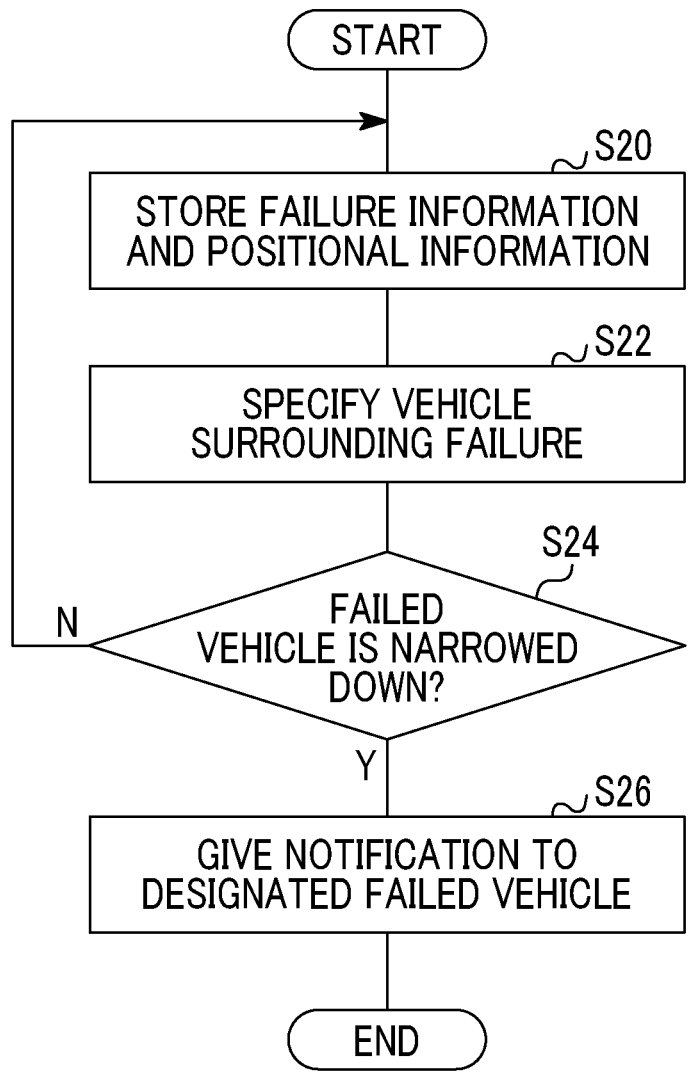

FAILED VEHICLE ESTIMATION SYSTEM, FAILED VEHICLE ESTIMATION METHOD AND COMPUTER-READABLE NON-TRANSITORY STORAGE MEDIUM

INCORPORATION BY REFERENCE

The disclosure of Japanese Patent Application No. 2017-228320 filed on Nov. 28, 2017 including the specification, drawings and abstract is incorporated herein by reference in its entirety.

BACKGROUND

1. Technical Field

The present disclosure relates to a failed vehicle estimation system, a failed vehicle estimation method, and a computer-readable non-transitory storage medium.

2. Description of Prior Art

Japanese Unexamined Patent Application Publication No. 2015-212133 (JP 2015-212133 A) discloses a failure detection system that images a vehicle in front of a host vehicle, detects the presence or absence of lighting of a lamp at the rear of the preceding vehicle from the captured image, and recognizes number information displayed on a license plate from the captured image to specify the preceding vehicle.

SUMMARY

A first aspect of the disclosure provides a failed vehicle estimation system. The failed vehicle estimation system includes a processor configured to: store (i) vehicle information including vehicle ID information of a plurality of vehicles and including positional information of the vehicles, the vehicle information being acquired from the vehicles, and (ii) failure information of a failed vehicle or at least one image, the at least one image being obtained by imaging an outside of the vehicles with a camera mounted in each of the vehicles, the failure information being obtained from at least one specific image among the at least one image; specify, based on the stored vehicle information, at least one specific vehicle, the at least one specific vehicle existing on a periphery of a mounting position of a specific camera, the specific camera having captured the at least one specific image, the at least one specific image being an image from which the failure information of the failed vehicle is obtained; estimate the failed vehicle from among the at least one specific vehicle; and notify a terminal apparatus associated with the estimated failed vehicle of information relating to a vehicle failure of the failed vehicle.

According to the above configuration, advanced camera performance for reading number information displayed on a license plate of a vehicle and analysis ability of the processor are not needed, and even though the number information displayed on the license plate of the vehicle is not read according to conditions of an inter-vehicle distance, weather, and the like, it is possible to estimate a failed vehicle.

In the first aspect, the processor may be configured to, when the at least one specific image includes a plurality of specific images, specify the at least one specific vehicle for each of failure information obtained from the plurality of specific images, and estimate, as the failed vehicle, a vehicle appearing in the plurality of specific images in a duplicate manner from among the at least one specific vehicle, the at least one specific vehicle being specified for each of the failure information. With this configuration, it is possible to narrow down to a failed vehicle from a plurality of vehicles specified by the processor.

A second aspect of the disclosure provides a failed vehicle estimation method. The failed vehicle estimation method includes storing (i) vehicle information including vehicle ID information of a plurality of vehicles and including positional information of the vehicles, the vehicle information being acquired from the vehicles, and (ii) failure information of a failed vehicle or at least one image, the at least one image being obtained by imaging an outside of the vehicles with a camera mounted in each of the vehicles, the failure information being obtained from at least one specific image among the at least one image; specifying, based on the stored vehicle information, at least one specific vehicle, the at least one specific vehicle existing on a periphery of a mounting position of a specific camera, the specific camera having captured the at least one specific image, the at least one specific image being an image from which the failure information of the failed vehicle is obtained; estimating the failed vehicle from among the at least one specific vehicle; and notifying a terminal apparatus associated with the estimated failed vehicle of information relating to a vehicle failure of the failed vehicle.

A third aspect of the disclosure provides a computer-readable non-transitory storage medium storing a failed vehicle estimation program causing a computer to execute storing (i) vehicle information including vehicle ID information of a plurality of vehicles and including positional information of the vehicles, the vehicle information being acquired from the vehicles, and (ii) failure information of a failed vehicle or at least one image, the at least one image being obtained by imaging an outside of the vehicles with a camera mounted in each of the vehicles, the failure information being obtained from at least one specific image among the at least one image, specifying, based on the stored vehicle information, at least one specific vehicle, the at least one specific vehicle existing on a periphery of a mounting position of a specific camera, the specific camera having captured the at least one specific image, the at least one specific image being an image from which the failure information of the failed vehicle is obtained, estimating the failed vehicle from among the at least one specific vehicle, and notifying a terminal apparatus associated with the estimated failed vehicle of information relating to a vehicle failure of the failed vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a flowchart illustrating failure detection processing of a vehicle-side terminal apparatus; and FIG. 5 is a flowchart illustrating failed vehicle estimation processing of a server apparatus.

DETAILED DESCRIPTION OF EMBODIMENTS

Figure 1:
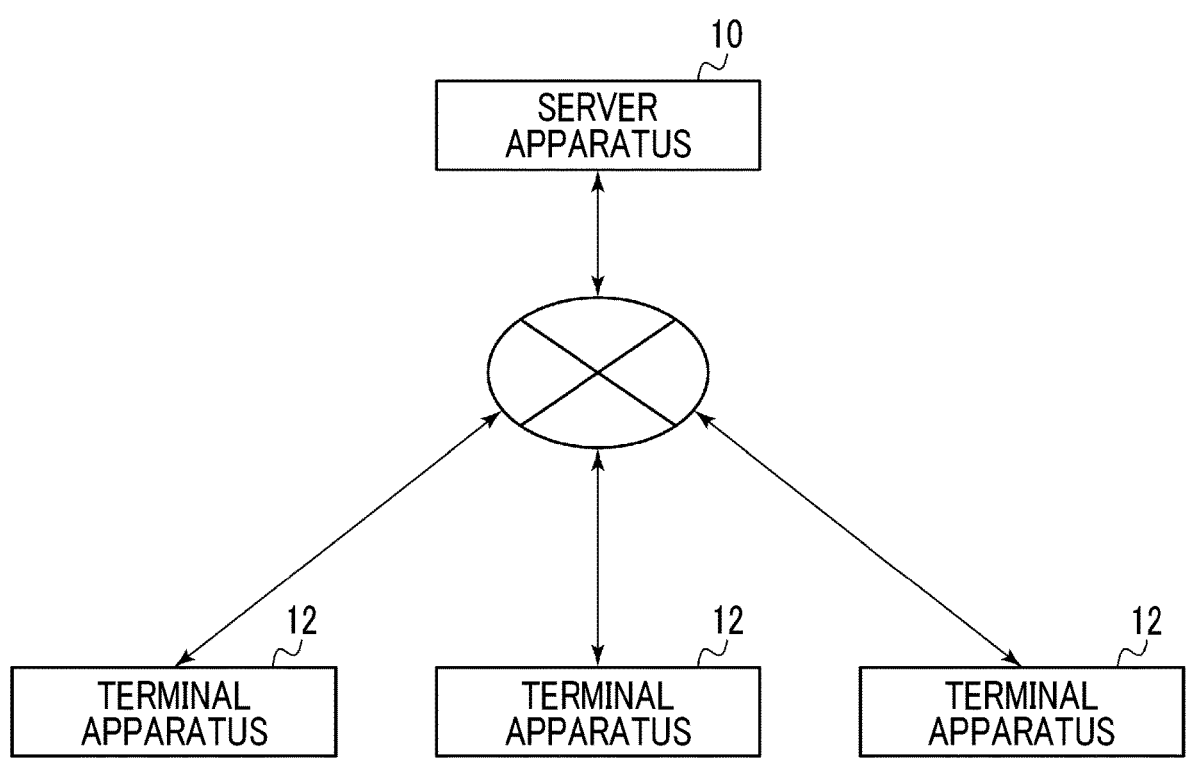
FIG. 1 is a schematic view showing a failed vehicle estimation system.

FIG. 1 is a schematic view showing a failed vehicle estimation system 1. The failed vehicle estimation system 1 is constituted of a server apparatus 10 and a terminal apparatus 12. The server apparatus 10 and the terminal apparatus 12 are connected through a network.

The terminal apparatus 12 is provided in a vehicle, and transmits positional information of the vehicle to the server apparatus 10 in a cycle. In a case where detection is made that a failure occurs in another surrounding vehicle, the terminal apparatus 12 transmits failure information of another vehicle to the server apparatus 10 along with the positional information of the host vehicle.

The server apparatus 10 collects positional information of a plurality of vehicles transmitted from a plurality of terminal apparatuses 12. The server apparatus 10 estimates a failed vehicle based on the failure information of the vehicle transmitted from the terminal apparatus 12 and the collected positional information of the vehicles, and notifies the terminal apparatus 12 of the estimated vehicle of the failure information.

Figure 2:
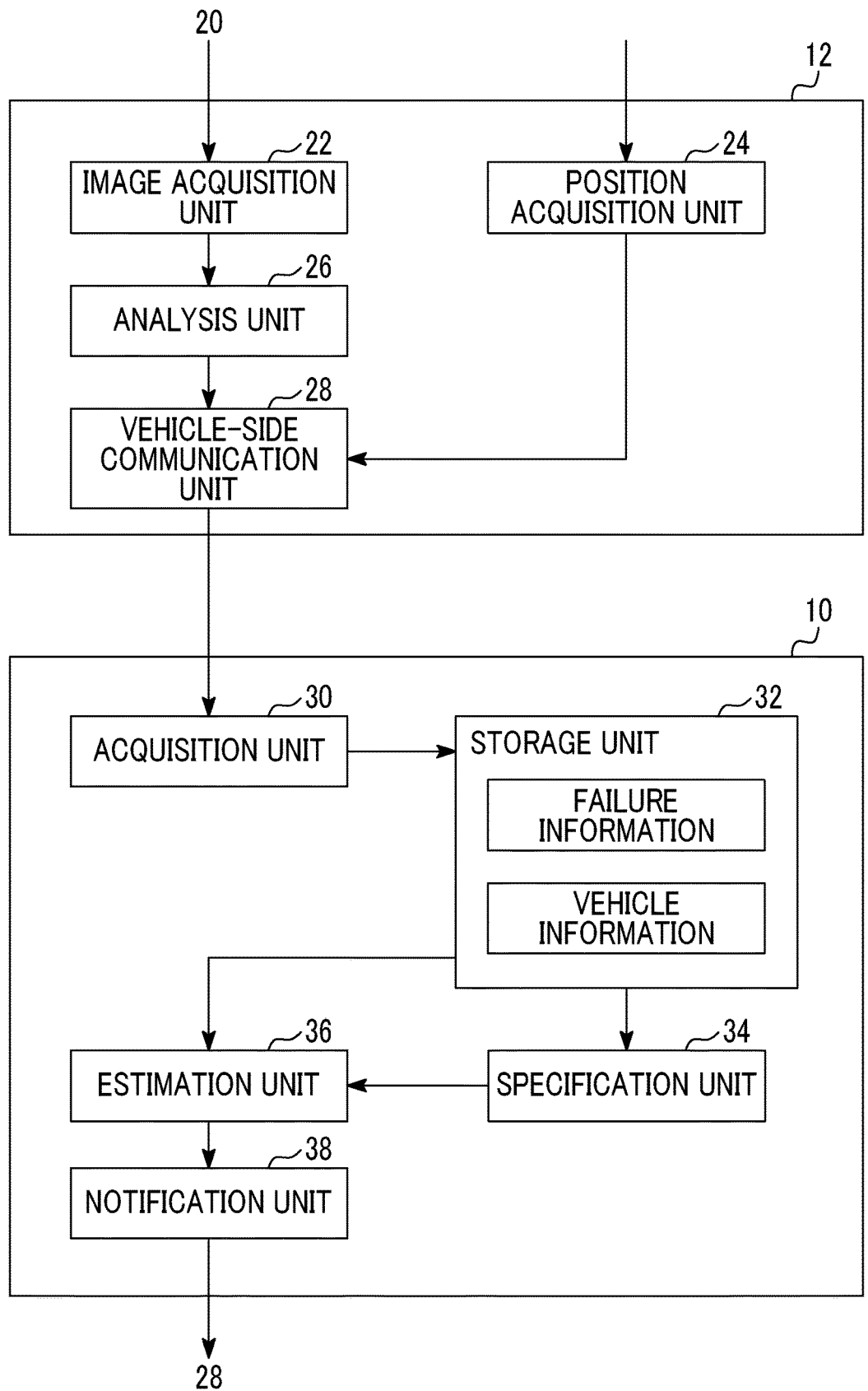
FIG. 2 is a diagram illustrating the functional configuration of the failed vehicle estimation system.

FIG. 2 is a diagram illustrating the functional configuration of the failed vehicle estimation system 1. In FIG. 2, elements that are described as functional blocks for performing various kinds of processing can be constituted of a circuit block, a memory, and other large scale integrations (LSIs) in terms of hardware or are realized by a computer-readable non-transitory storage medium or the like storing a program loaded in a memory in terms of software. Accordingly, it can be understood by those skilled in the art that the functional blocks can be realized in various forms by hardware solely, software solely, or a combination of hardware and software, and are not limited to either one.

The terminal apparatus 12 includes an image acquisition unit 22, a position acquisition unit 24, an analysis unit 26, and a vehicle-side communication unit 28. The image acquisition unit 22 acquires, from a camera 20 provided in the vehicle, a captured image obtained by imaging the outside of the vehicle surrounding the vehicle and the time when the captured image is captured. The camera 20 images not only an area in front of the vehicle but also areas on the right and left of the vehicle and behind the vehicle.

The position acquisition unit 24 acquires, using a global positioning system (GPS), the positional information of the vehicle and the time when the positional information is obtained. The position acquisition unit 24 acquires, for example, from a navigation device, the positional information of the vehicle and the time when the positional information is obtained.

The analysis unit 26 analyzes the captured image surrounding the vehicle to detect the presence of another vehicle, and detects whether or not a failure occurs in another vehicle. The analysis unit 26 detects a failure represented in a form visible in the appearance of another vehicle, and detects, for example, non-lighting of lights on the front and rear sides of the vehicle, missing of an exterior part, oil leakage, or the like. For example, in a case where a state in which one of a taillight and a brake light of another vehicle is lighted and the other light is non-lighted is extracted from the captured image, the analysis unit 26 detects that the light at the rear of another vehicle fails. For example, processing for detecting non-lighting of a light can easily perform detection with a low processing load without needing advanced camera performance for reading number information displayed on a license plate of a vehicle and analysis ability of a processing device. Even though a condition of an inter-vehicle distance, weather, or the like is not good, non-lighting of a light is easily detected.

The analysis unit 26 generates failure information in a case where a failure of another vehicle is detected. The failure information includes information indicating a type of a detected failure and the time when an image of a failed vehicle is captured.

The vehicle-side communication unit 28 transmits, to the server apparatus 10, a vehicle ID, positional information of the host vehicle, and the time when the positional information is obtained, in a cycle. With this, the server apparatus 10 collects vehicle information including the positional information of the vehicles, thereby ascertaining the position of each vehicle.

In a case where the failure information is received from the analysis unit 26, the vehicle-side communication unit 28 transmits, to the server apparatus 10, the failure information of another vehicle and the positional information of the host vehicle at the time included in the failure information. With this, the server apparatus 10 can specify a surrounding vehicle from the time when the image of the failed vehicle is captured and the position of the failed vehicle. The terminal apparatus 12 executes image analysis and transmits the failure information to the server apparatus 10, whereby it is possible to suppress the amount of communication data compared to a case where the terminal apparatus 12 transmits captured images to the server apparatus 10 and the server apparatus 10 analyzes the captured images. The vehicle-side communication unit 28 may transmit the failure information to the server apparatus 10 when the vehicle is parked, that is, when an ignition switch is turned off.

In a case where the host vehicle follows the failed vehicle, the analysis unit 26 detects the failed vehicle in a predetermined cycle, and the vehicle-side communication unit 28 transmits the failure information of the same failed vehicle to the server apparatus 10 in a cycle. A situation of another vehicle surrounding the host vehicle is changed, and the server apparatus 10 easily estimates the failed vehicle.

The server apparatus 10 includes an acquisition unit 30, a storage unit 32, a specification unit 34, an estimation unit 36, and a notification unit 38. The acquisition unit 30 collects vehicle information from a plurality of terminal apparatuses 12, and also acquires failure information from a plurality of terminal apparatuses 12.

The storage unit 32 stores the vehicle information acquired from the terminal apparatuses 12 of a plurality of vehicles, and stores the failure information acquired from the terminal apparatuses 12 of the vehicles. The storage unit 32 stores, as the vehicle information, the vehicle ID, the positional information of the vehicle, and the time when the positional information is obtained, in association with each other. The storage unit 32 stores a vehicle ID registered in advance and an address of the terminal apparatus 12 of the vehicle, and the vehicle ID and the address are used for notification in the notification unit 38. The storage unit 32 stores, as the failure information, the vehicle ID of the vehicle that transmits the failure information, the type of the failure, and the positional information and the time at the time of the failure. The positional information and the time at the time of the failure may be positional information of the vehicle that transmits the failure information at the time when the failure information is obtained and the time when the failure information is obtained.

The specification unit 34 specifies a vehicle surrounding a position where the failure information of the vehicle is obtained, that is, a position of the camera 20 having captured the image, from which the failure information is obtained, based on the stored vehicle information. The specification unit 34 specifies a vehicle within a predetermined range, for example, within 30 meters from the positional information included in the failure information from the stored vehicle information. The predetermined range is set by a general inter-vehicle distance, the accuracy of the GPS, a transmission cycle of the positional information, or the like.

The specification unit 34 specifies a vehicle surrounding the position where the failure information is obtained, for each piece of the failure information acquired from the terminal apparatuses 12 of the vehicles. With the use of the failure information obtained from the vehicles, since the situation surrounding the failed vehicle is changed, it is possible to find the failed vehicle with high accuracy.

In a case where it is not possible to specify a vehicle surrounding the position where the failure information is obtained, that is, in a case where the captured failed vehicle is not a vehicle registered in the storage unit 32, the specification unit 34 makes the storage unit 32 discard the failure information.

The estimation unit 36 estimates the failed vehicle from among the vehicles specified by the specification unit 34. In a case where the number of vehicles specified by the specification unit 34 is one, that is, in a case where the number of vehicles surrounding the position where the failure information is obtained is one, the estimation unit 36 estimates the specified vehicle as the failed vehicle.

In a case where a plurality of vehicles is specified by the specification unit 34, the estimation unit 36 narrows down to the failed vehicle using the failure information obtained from the vehicles. The estimation unit 36 may estimate, as the failed vehicle, a vehicle duplicated a predetermined number of times or more from among the vehicles specified for the failure information obtained from the terminal apparatuses 12 of the vehicles. For example, the estimation unit 36 estimates, as the failed vehicle, a vehicle appearing as a candidate of a failed vehicle specified by the specification unit 34 for each piece of the failure information obtained from the terminal apparatuses 12 five times or more. With this, it is possible to narrow down to the failed vehicle from the vehicles specified by the specification unit 34.

The estimation unit 36 may estimate the failed vehicle in association with whether or not a plurality of pieces of failure information obtained from the vehicles is the failure information for the same failed vehicle based on the type of the failure, the positional information, and the time when the positional information is obtained, included in the failure information. For example, in a case where the type of the failure is coincident with each other and the positional information and the time when the positional information is obtained are within a predetermined reference range, the estimation unit 36 determines that the failure information is the failure information for the same failed vehicle, and in a case where at least the type of the failure is not coincident with each other, the estimation unit 36 determines that the failure information is not the failure information for the same failed vehicle. With this, it is possible to associate the failure information obtained from the vehicles with information for the same failed vehicle. In a case where determination is made that the failure information is the failure information for the same failed vehicle, the estimation unit 36 estimates, as the failed vehicle, a vehicle duplicated from among the vehicles specified for the failure information obtained from the vehicles.

The notification unit 38 notifies the terminal apparatus 12 associated with the vehicle ID of the failed vehicle estimated by the estimation unit 36 of information relating to the vehicle failure. Information relating to the vehicle failure includes information indicating the type of the failure and guide information for repairing the failure. As the guide information for repairing the failure, information regarding a support center or a maintenance facility of the vehicle is shown. As described above, even though an advanced image analysis apparatus that reads number information displayed on a license plate of a vehicle is not mounted in each vehicle, it is possible to estimate the failed vehicle from the vehicles surrounding the imaging position and to given notification to a driver of the failed vehicle.

In a case where the storage unit 32 stores an address of a portable terminal of the driver in association with the vehicle ID, the notification unit 38 transmits information relating to a vehicle failure to the portable terminal of the driver.

Figure 3A:
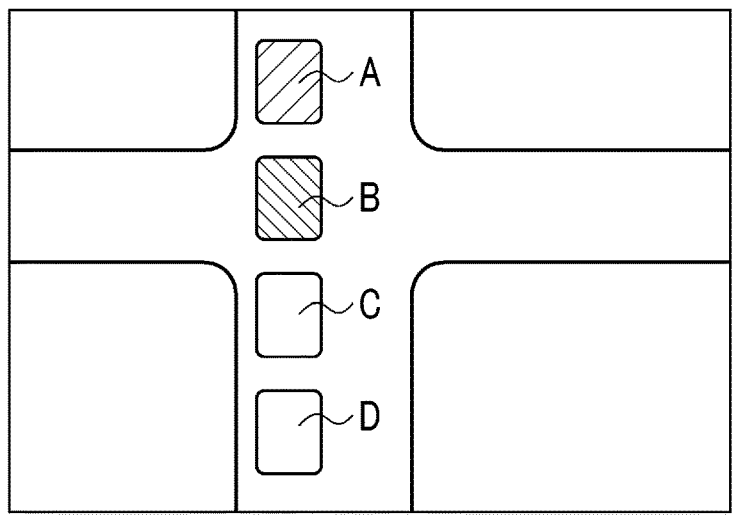
FIG. 3A is a diagram illustrating processing for estimating a failed vehicle in an estimation unit.
Figure 3B:
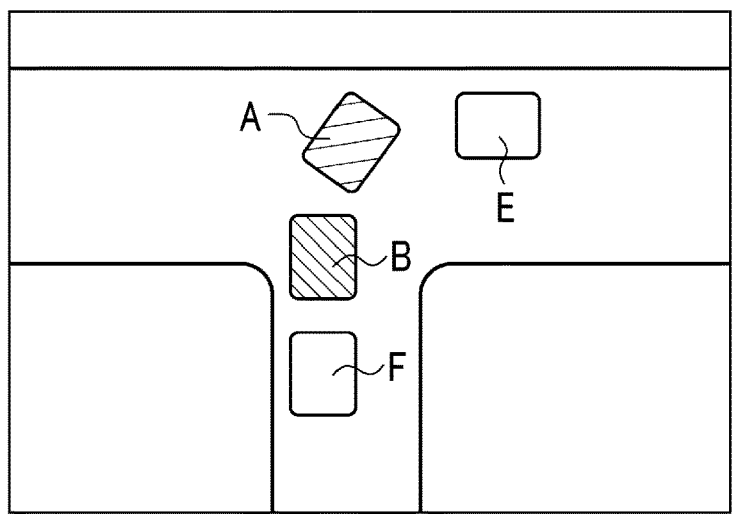
FIG. 3B is a diagram illustrating the processing for estimating a failed vehicle in the estimation unit.
Figure 3C:
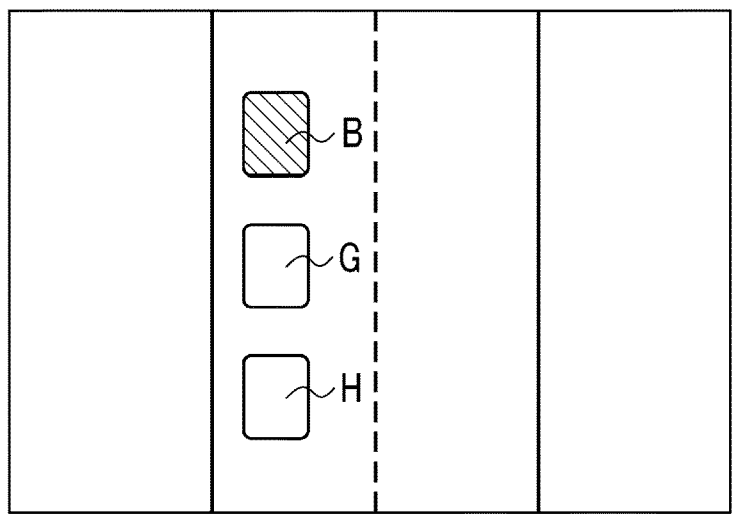
FIG. 3C is a diagram illustrating the processing for estimating a failed vehicle in the estimation unit.

FIGS. 3A to 3C are diagrams illustrating processing for estimating the failed vehicle in the estimation unit 36. FIGS. 3A to 3C show a state when a vehicle that is traveling on a road is viewed from a bird's eye view. In FIG. 3A, an analysis unit 26 of a vehicle C detects a failure of a vehicle B from a captured image, and a vehicle-side communication unit 28 transmits failure information of the vehicle B and positional information of the host vehicle at the time of imaging to the server apparatus 10. In the server apparatus 10, the storage unit 32 stores the acquired failure information and positional information, and the specification unit 34 specifies a vehicle A, the vehicle B, and a vehicle D surrounding the vehicle C. Since a plurality of vehicles is specified, the estimation unit 36 does not narrow down to a failed vehicle merely with the failure information from the vehicle C.

In FIG. 3B, an analysis unit 26 of a vehicle F detects the failure of the vehicle B from a captured image, and a vehicle-side communication unit 28 transmits the failure information of the vehicle B and positional information of the host vehicle at the time of imaging to the server apparatus 10. In the server apparatus 10, the storage unit 32 stores the acquired failure information and positional information, and the specification unit 34 specifies the vehicle A, the vehicle B, and a vehicle E surrounding the vehicle F. The estimation unit 36 determines whether or not the failure information obtained from the vehicle C and the failure information obtained from the vehicle F are failure information for the same failed vehicle based on the type of the failure, the positional information, and the time when the positional information is obtained, included in the failure information, and since the type of the failure is identical, and the positional information and the time when the positional information is obtained are close, determines that the failure information obtained from the vehicle C and the failure information obtained from the vehicle F are the failure information for the same failed vehicle. The estimation unit 36 estimates the vehicle A and the vehicle B as a candidate vehicle of the failed vehicle, and does not yet narrow down to one vehicle.

In FIG. 3C, an analysis unit 26 of a vehicle G detects the failure of the vehicle B from a captured image, and a vehicle-side communication unit 28 transmits the failure information of the vehicle B and positional information of the host vehicle at the time of imaging to the server apparatus 10. In the server apparatus 10, the storage unit 32 stores the acquired failure information and positional information, and the specification unit 34 specifies the vehicle B and a vehicle H surrounding the vehicle G. The estimation unit 36 determines that the failure information obtained from the vehicle C and the vehicle F and the failure information obtained from the vehicle G are failure information for the same failed vehicle. The storage unit 32 estimates, as the failed vehicle, one vehicle B duplicated from among the vehicles specified for the failure information obtained from the vehicle C, the vehicle F, and the vehicle G. As described above, with the use of the failure information of the vehicle, a situation surrounding the vehicle detecting the failure information is changed, and it is possible to narrow down to the failed vehicle.

FIG. 4 is a flowchart illustrating failure detection processing of the vehicle-side terminal apparatus 12. The image acquisition unit 22 acquires a captured image obtained by imaging the outside of the vehicle with the camera 20 in a cycle (S10). The position acquisition unit 24 acquires the positional information of the host vehicle in a cycle (S12), and the vehicle-side communication unit 28 transmits the positional information of the host vehicle to the server apparatus 10 in a predetermined cycle.

The analysis unit 26 analyzes the captured image and detects whether or not the failed vehicle is included in the captured image (S14). In a case where there is no failed vehicle on the captured image (N in S16), the process ends. In a case where there is the failed vehicle on the captured image (Yin S16), the analysis unit 26 generates failure information, and the vehicle-side communication unit 28 transmits, to the server apparatus 10, the failure information and the positional information when the captured image is obtained.

FIG. 5 is a flowchart illustrating failed vehicle estimation processing of the server apparatus 10. The storage unit 32 stores the failure information and the positional information obtained from the terminal apparatus 12 (S20). The storage unit 32 stores the positional information of the vehicles obtained from a plurality of terminal apparatuses 12 as vehicle information separately from the failure information.

The specification unit 34 specifies a vehicle surrounding a camera position obtained from the failure information based on the stored vehicle information (S22). The estimation unit 36 determines whether or not the failed vehicle is narrowed down from among the vehicles specified by the specification unit 34 (S24).

In a case where the estimation unit 36 does not narrow down to one failed vehicle (N in S24), the process returns to S20, the server apparatus 10 waits for acquisition of further failure information. With a plurality of pieces of failure information, in a case where the duplicated vehicle is narrowed down to one vehicle with comparison of the vehicle ID of the specified vehicle (Y in S24), the estimation unit 36 estimates one duplicated vehicle as the failed vehicle, and the notification unit 38 notifies the terminal apparatus 12 associated with the estimated failed vehicle of information relating to a vehicle failure (S26). As described above, it is possible to estimate and give notification of the failed vehicle from the vehicles surrounding the imaging position where the failed vehicle is detected.

The example is just for illustration, and it can be understood by those skilled in the art that various modification examples to a combination of the constituent elements may be made and such modification examples also fall within the scope of the disclosure.

The analysis unit 26 of the terminal apparatus 12 may estimate a vehicle type of the failed vehicle and may include feature information indicating the vehicle type of the failed vehicle in the failure information. The feature information is, for example, information that is roughly classified into a truck, an off-road vehicle, a sedan, a station wagon, and the like. In a case where number information displayed on the license plate of the failed vehicle, the analysis unit 26 may include the number information in the failure information. As described above, the number information or the feature information of the failed vehicle may be included in the failure information. The storage unit 32 stores the vehicle ID registered in advance, the feature information, and the number information. The specification unit 34 specifies a vehicle surrounding the position where the failure information is obtained, using the feature information and the number information included in the failure information.

In the example, although an aspect where the vehicle-side terminal apparatus 12 analyzes the captured image and detects the failure of the vehicle has been described, the disclosure is not limited to the aspect, and image analysis may be executed in the server apparatus 10. In the modification example, the terminal apparatus 12 transmits, to the server apparatus 10, the captured image, the acquired positional information, and the time when the positional information is obtained, in a cycle, and the storage unit 32 of the server apparatus 10 stores the captured images obtained by imaging the outside of the vehicle with the camera 20 acquired from a plurality of vehicles. The analysis unit of the server apparatus 10 detects the failed vehicle from the stored captured images, and the storage unit 32 stores the failure information. Subsequent processing is the same as in the example.

Also, the expression "failed vehicle estimation system" may indicate a server apparatus.

What is claimed is:

1. A failed vehicle estimation system comprising a processor configured to: store
   (i) vehicle information including vehicle ID information of a plurality of vehicles and including positional information of the plurality of the vehicles, the vehicle information being acquired from the plurality of the vehicles, and
   (ii) at least one image being obtained by imaging an outside of the plurality of the vehicles with a camera mounted in each of the plurality of the vehicles, or vehicle failure information being obtained from at least one specific image among the at least one image;
   specify, based on the stored vehicle information, at least one specific vehicle, the at least one specific vehicle existing on a periphery of a mounting position of a specific camera, the specific camera having captured the at least one specific image, the at least one specific image being an image from which the failure information of the failed vehicle is obtained;
   estimate a failed vehicle from among the at least one specific vehicle; and
   notify the vehicle failure information to a terminal apparatus mounted in the estimated failed vehicle, wherein
   when (i) the at least one specific image includes a plurality of specific images each being captured by a camera mounted on one different vehicle of the plurality of vehicles, and (ii) the vehicle failure information includes a plurality of pieces of vehicle failure information each piece being obtained from one different specific image of the plurality of specific images, the at least one specific vehicle includes a plurality of groups of specific vehicles, each group being specified for one different piece of vehicle failure information of the plurality of pieces of vehicle failure information, and
the processor is configured to estimate, as the failed vehicle, a vehicle appearing in the plurality of specific images in a duplicate manner from among the plurality of groups of specific vehicles when each piece of vehicle failure information of the plurality of pieces of vehicle failure information is failure information for the failed vehicle.

2. The failed vehicle estimation system according to claim 1, wherein the processor is configured to detect the vehicle failure information from the at least one image.

3. The failed vehicle estimation system according to claim 1, wherein the processor is configured to store, in association with the vehicle ID information, as the vehicle information, the positional information of the vehicles and a time, at which the positional information is obtained.

4. The failed vehicle estimation system according to claim 1, wherein
the processor is configured to store information relating to a type of the failure as the failure information, and
the processor is configured to estimate, based on at least the type of the failure, as the failed vehicle, the vehicle appearing in the plurality of specific images in the duplicate manner.

5. A failed vehicle estimation method comprising:
storing
(i) vehicle information including vehicle ID information of a plurality of vehicles and including positional information of the plurality of the vehicles, the vehicle information being acquired from the plurality of the vehicles, and
(ii) at least one image being obtained by imaging an outside of the plurality of the vehicles with a camera mounted in each of the plurality of the vehicles, or vehicle failure information being obtained from at least one specific image among at least one image;
specifying, based on the stored vehicle information, at least one specific vehicle, the at least one specific vehicle existing on a periphery of a mounting position of a specific camera, the specific camera having captured the at least one specific image, the at least one specific image being an image from which the failure information of the failed vehicle is obtained;
estimating a failed vehicle from among the at least one specific vehicle; and
notifying the vehicle failure information to a terminal apparatus mounted in the estimated failed vehicle, wherein
when (i) the at least one specific image includes a plurality of specific images each being captured by a camera mounted on one different vehicle of the plurality of vehicles, and (ii) the vehicle failure information includes a plurality of pieces of vehicle failure information each piece being obtained from one different specific image of the plurality of specific images, the at least one specific vehicle includes a plurality of groups of specific vehicles, each group being specified for one different piece of vehicle failure information of the plurality of pieces of vehicle failure information, and
the method further comprises estimating, as the failed vehicle, a vehicle appearing in the plurality of specific images in a duplicate manner from among the plurality of groups of specific vehicles when each piece of vehicle failure information of the plurality of pieces of vehicle failure information is failure information for the failed vehicle.

6. A computer-readable non-transitory storage medium storing a failed vehicle estimation program causing a computer to execute
storing
(i) vehicle information including vehicle ID information of a plurality of vehicles and including positional information of the plurality of the vehicles, the vehicle information being acquired from the plurality of the vehicles, and
(ii) at least one image obtained by imaging an outside of the plurality of the vehicles with a camera mounted in each of the plurality of the vehicles, or vehicle failure information being obtained from at least one specific image among the at least one image,
specifying, based on the stored vehicle information, at least one specific vehicle, the at least one specific vehicle existing on a periphery of a mounting position of a specific camera, the specific camera having captured the at least one specific image, the at least one specific image being an image from which the failure information of the failed vehicle is obtained,
estimating a failed vehicle from among the at least one specific vehicle, and
notifying the vehicle failure information to a terminal apparatus mounted in the estimated failed vehicle, wherein
when (i) the at least one specific image includes a plurality of specific images each being captured by a camera mounted on one different vehicle of the plurality of vehicles, and (ii) the vehicle failure information includes a plurality of pieces of vehicle failure information each piece being obtained from one different specific image of the plurality of specific images, the at least one specific vehicle includes a plurality of groups of specific vehicles, each group being specified for one different piece of vehicle failure information of the plurality of pieces of vehicle failure information, and
the failed vehicle estimation program causing the computer to execute estimating, as the failed vehicle, a vehicle appearing in the plurality of specific images in a duplicate manner from among the plurality of groups of specific vehicles when each piece of vehicle failure information of the plurality of pieces of vehicle failure information is failure information for the failed vehicle.

* * * * *